(12) United States Patent
Dimitrov et al.

(10) Patent No.: US 8,289,660 B2
(45) Date of Patent: Oct. 16, 2012

(54) AUXILIARY MAGNETORESISTIVE SHIELD

(75) Inventors: Dimitar Velikov Dimitrov, Edina, MN (US); Dion Song, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 71 days.

(21) Appl. No.: 12/816,545

(22) Filed: Jun. 16, 2010

(65) Prior Publication Data

US 2011/0310513 A1    Dec. 22, 2011

(51) Int. Cl.
 *G11B 5/39* (2006.01)
(52) U.S. Cl. ....................................... 360/319
(58) Field of Classification Search ............ 360/319
 See application file for complete search history.

(56) References Cited

U.S. PATENT DOCUMENTS

| | | | |
|---|---|---|---|
| 5,576,914 A | 11/1996 | Rottmayer et al. | |
| 7,035,062 B1 | 4/2006 | Mao et al. | |
| 7,151,654 B1 | 12/2006 | Mao et al. | |
| 7,177,122 B2 | 2/2007 | Hou et al. | |
| 7,277,262 B2 | 10/2007 | Takagishi et al. | |
| 7,369,374 B2 | 5/2008 | Gill et al. | |
| 7,623,324 B2 * | 11/2009 | Honda et al. | 360/324.12 |
| 7,876,534 B2 * | 1/2011 | Chou et al. | 360/319 |
| 8,144,437 B2 * | 3/2012 | Miyauchi et al. | 360/324.12 |
| 2005/0264944 A1 * | 12/2005 | Fontana et al. | 360/313 |
| 2009/0034132 A1 * | 2/2009 | Miyauchi et al. | 360/324 |
| 2009/0168241 A1 * | 7/2009 | Mochizuki et al. | 360/125.03 |
| 2009/0180217 A1 * | 7/2009 | Chou et al. | 360/324 |
| 2009/0262465 A1 * | 10/2009 | Hatatani et al. | 360/319 |
| 2010/0039734 A1 * | 2/2010 | Hara et al. | 360/319 |
| 2011/0069417 A1 * | 3/2011 | Kawamori et al. | 360/319 |

* cited by examiner

*Primary Examiner* — Mark Blouin
(74) *Attorney, Agent, or Firm* — Hall Estill Attorneys at Law

(57) ABSTRACT

An apparatus includes a magnetoresistive read element, first and second primary shields, and an auxiliary shield. The magnetoresistive read element is located between the first and the second primary shields, and the auxiliary shield is located between the magnetoresistive read element and the first primary shield. In another embodiment, the apparatus includes a plurality of magnets located between a plurality of shields for a magnetoresistive element. The plurality of magnets is optionally offset from the magnetoresistive element.

20 Claims, 6 Drawing Sheets

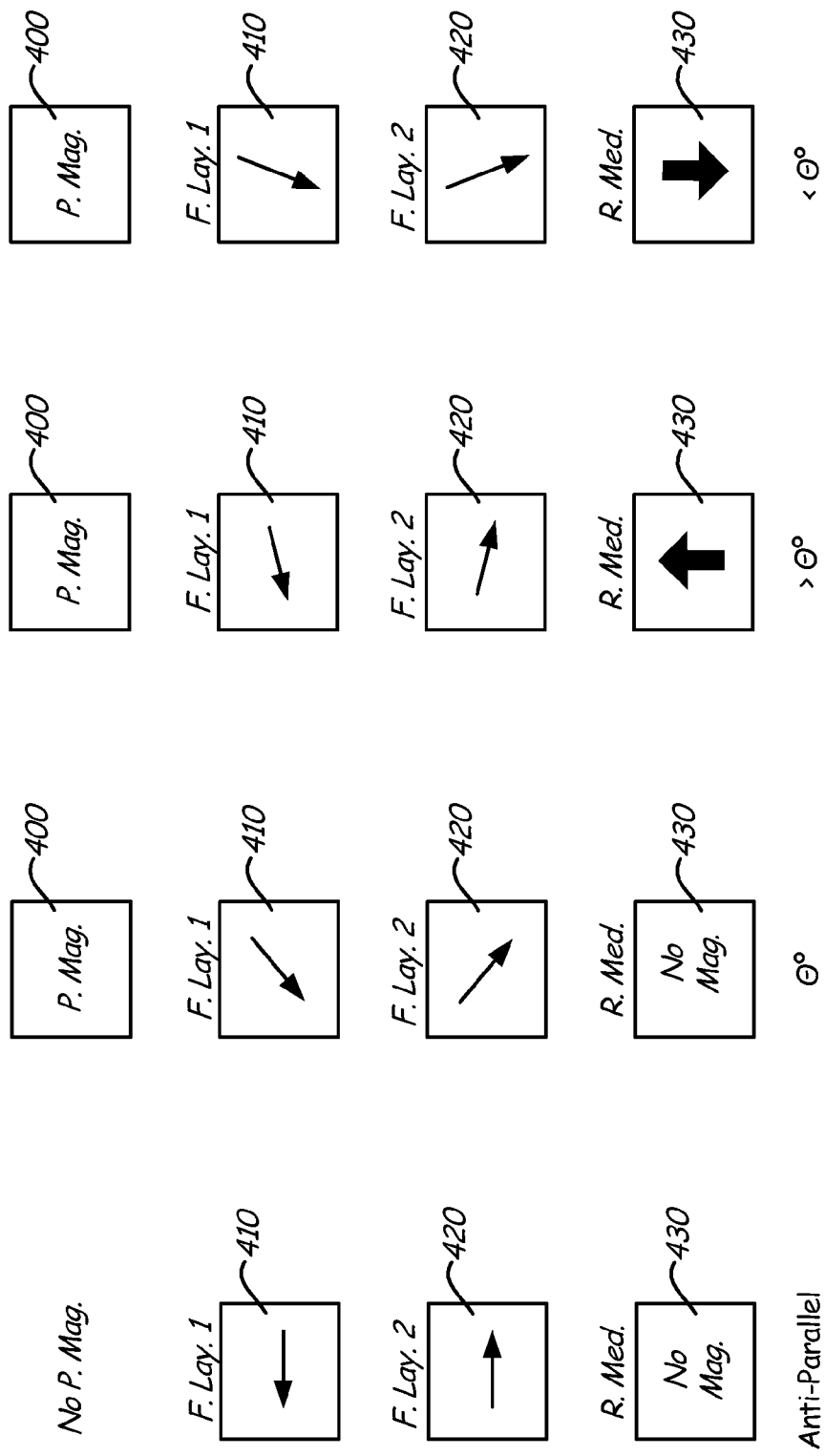

AUXILIARY MAGNETORESISTIVE SHIELD

BACKGROUND

Data storage systems commonly have a recording head that writes information to and reads information from a recording medium. One method of reading information from a recording medium utilizes a magnetoresistive transducer. An electrical current is passed through the magnetoresistive transducer as a magnetized recording medium is rotated beneath it. The electrical resistance of the magnetoresistive transducer, and hence the voltage across the transducer, changes in response to changes in the recording medium magnetization. Accordingly, the information written to the recording medium is able to be retrieved.

SUMMARY

In one embodiment, an apparatus includes a magnetoresistive read element, first and second primary shields, and an auxiliary shield. The magnetoresistive read element is located between the first and the second primary shields, and the auxiliary shield is located between the magnetoresistive read element and the first shield. In another embodiment, the apparatus includes a plurality of magnets located between a plurality of shields for a magnetoresistive element. The plurality of magnets is optionally offset from the magnetoresistive element.

BRIEF DESCRIPTION OF THE DRAWINGS

FIGS. 4A, 4B, 4C, and 4D illustrate the operation of a tri-layer reading element according to an embodiment.

DETAILED DESCRIPTION

Figure 1:
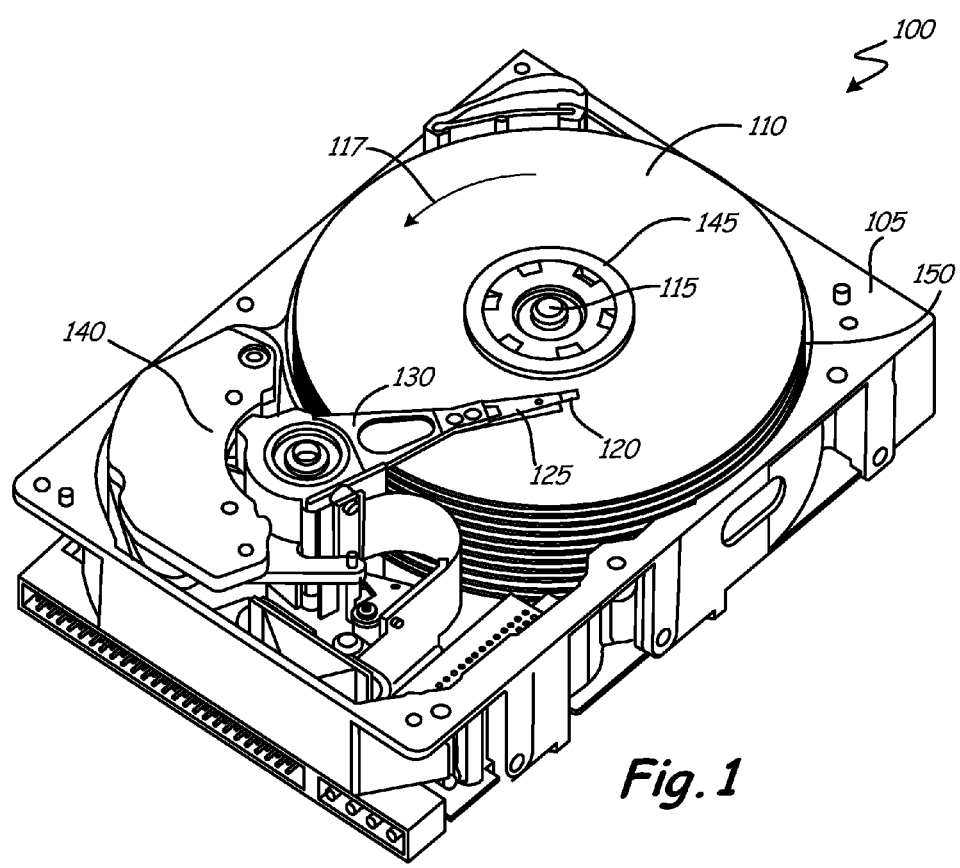
FIG. 1 is a perspective view of a data storage system with its housing cover removed.

FIG. 1 is a perspective view of a hard disc drive 100. Hard disc drives are a common type of data storage system. While embodiments of this disclosure are described in terms of disc drives, other types of data storage systems (e.g. solid state or optical data storage systems) should be considered within the scope of the present disclosure. Disc drive 100 includes an enclosure 105. Disc drive 100 further includes a disc or recording medium 110. Those skilled in the art will recognize that disc drive 100 can contain a single disc or multiple discs. Medium 110 is mounted on a spindle motor assembly 115 that facilitates rotation of the medium about a central axis. An illustrative direction of rotation is shown by arrow 117. Each disc surface has an associated slider 120 that carries a recording head for communication with the surface of the disc. Each slider 120 is supported by a head gimbal assembly 125, which is in turn attached to an actuator arm 130. Each actuator arm 130 is rotated about a shaft by a voice coil motor assembly 140. As voice coil motor assembly 140 rotates actuator arm 130, slider 120 moves in a path between a disc inner diameter 145 and a disc outer diameter 150. Medium 110 illustratively includes a number of concentric recording tracks between disc inner diameter 145 and disc outer diameter 150.

Figure 2:
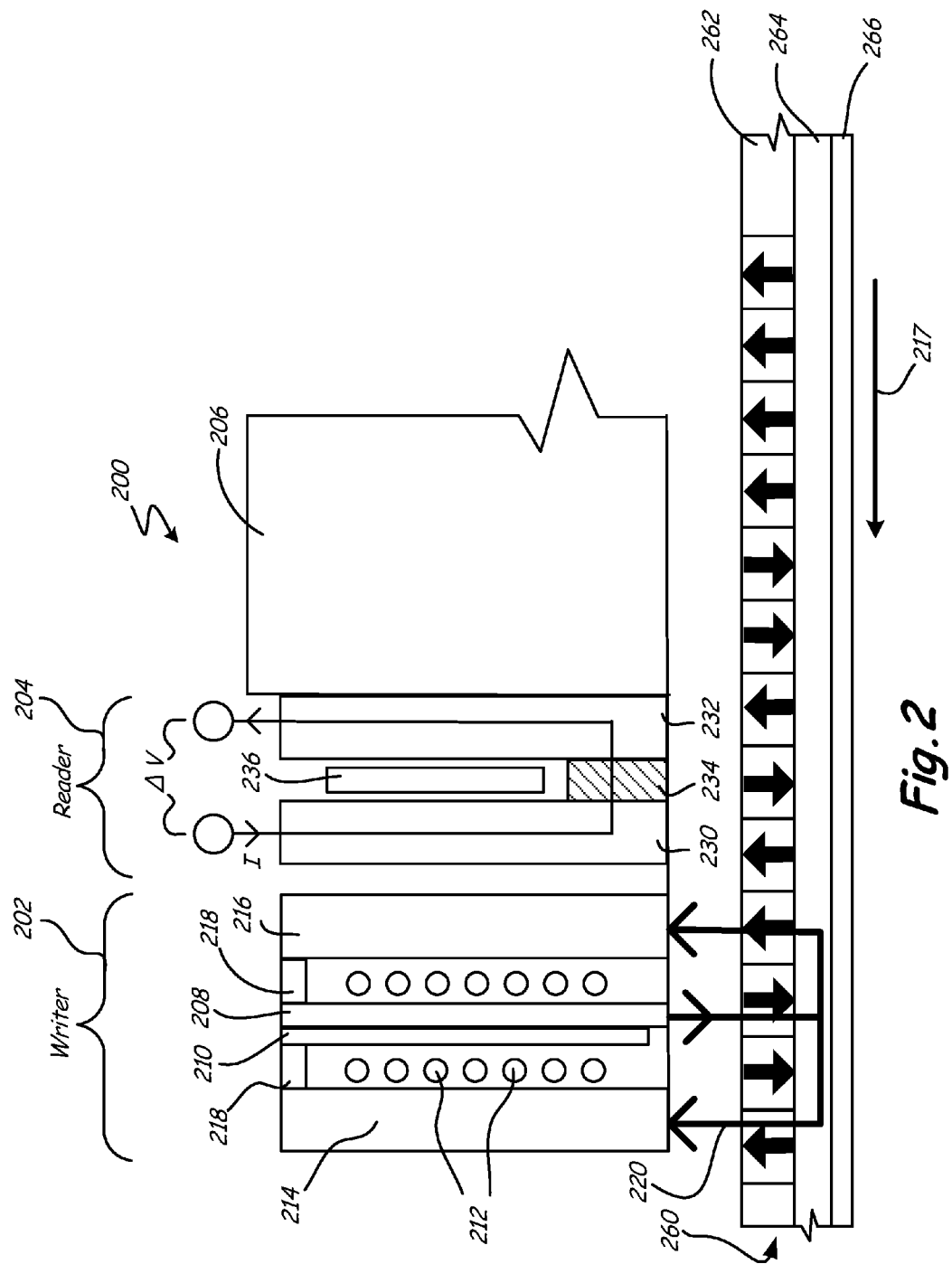
FIG. 2 is a schematic diagram of a cross-section of a recording head writing to a recording medium according to an embodiment.

FIG. 2 is a schematic diagram of a cross-section of a recording head 200 writing to a recording medium 260. Recording head 200 is illustratively carried by a slider such as slider 120 in FIG. 1, and medium 260 is illustratively a storage medium such as medium 110 in FIG. 1. FIG. 2 is a simplified diagram only showing cross-sectional views of some components of a recording head. Those skilled in the art will recognize that recording heads commonly include other components such as, but not limited to, insulating materials and additional electrical connection points.

Head 200 includes a writing element 202, a reading element 204, and a main body 206. For simplification purposes, only a portion of main body 206 is shown in the figure. Those skilled in the art will recognize that main body 206 illustratively includes an air bearing surface that helps control the "fly height" or head-to-media spacing between head 200 and medium 260.

Writing element 202 includes a write pole 208, a yoke 210, magnetization coils 212, a first return pole 214, a second return pole 216, and a via 218. Recording medium 260 includes a recording layer 262, an underlayer 264, and a substrate 266. Recording layer 262 is illustratively a hard magnetic layer that is capable of storing a magnetization pattern, and underlayer 264 is illustratively a soft magnetic material that allows for magnetic flux to pass through. Arrow 217 is illustratively a direction of rotation such as arrow 117 in FIG. 1, and medium 260 optionally rotates in the direction shown by arrow 217.

In an embodiment, electric current is passed through coils 212 to generate magnetic flux 220. Flux 220 passes from write pole 208, through recording layer 262, into underlayer 264, and across to return poles 214 and 216. The polarity of magnetic flux 220 is illustratively reversed by reversing the polarity of the electric current passed through coils 212. Magnetic flux 220 illustratively records a magnetization pattern to recording layer 262. A magnetization pattern is represented by the up and down arrows shown in the figure.

Reading element 204 includes a top shield 230, a bottom shield 232, a transducer or magnetoresistive element 234, and a magnet 236. An electrical current is illustratively passed from top shield 230, through magnetoresistive element 234, and back through bottom shield 232. The electrical resistance of magnetoresistive element 234 illustratively changes in response to the magnetic fields from the recording medium beneath it. Recording head 200 is able to determine the magnetization pattern in recording layer 262 by detecting the varying voltage differential across reading element 204.

Top shield 230 and bottom shield 232 act to control the magnetic field that reaches magnetoresistive element 234. Shields 232 and 234 for instance isolate the magnetic field that reaches magnetoresistive element 234 such that the element is able to detect the magnetization of the area of the recording medium immediately beneath it. In one example, shields 230 and 232 reduce the effects of bits written to recording layer 262 that are adjacent to the bit that is intended to be read.

One issue encountered in increasing the areal density of data storage systems is the spacing or distance between top shield 230 and bottom shield 232 (i.e. the shield-to-shield spacing). As aerial density increases, bits of information are written to smaller areas of recording media. The shield-toshield spacing may be correspondingly reduced so that the read transducer is able to properly detect the magnetization of the recording medium.

Magnet 236 is utilized in providing a magnetic biasing field to magnetoresistive element 234. In one embodiment, magnet 236 is a permanent magnet (i.e. it is made from a material that is magnetized and creates its own persistent magnetic field). Embodiments of magnet 236 are not however limited to any particular type of magnet and include any type of magnet. The operation of magnet 236 is illustrated in FIGS. 4A, 4B, 4C, and 4D below.

One issue that has been encountered in decreasing the magnetoresistive element shield-to-shield spacing has been a reduction in the uniformity of the magnet biasing field across the magnetoresistive element. More particularly, the biasing field decays across the magnetoresistive element such that the magnetic field is strongest at the back of the element (i.e. the portion furthest from the recording medium) and weakest at the front of the element (i.e. the portion closest to the recording medium). In fact, in at least certain recording heads, the shield-to-shield spacing has been found to directly influence field decay (i.e. increasing the spacing increases uniformity while decreasing the spacing decreases the uniformity).

As is described below, embodiments of the present disclosure include features that increase the uniformity of the biasing field across the magnetoresistive element. In one embodiment, recording heads have one or more auxiliary shields. The auxiliary shields illustratively have magnetic saturation values that are lower than those of the primary shields and of the magnet biasing field. This allows for the auxiliary shields to be magnetically saturated towards the back of the magnetoresistive element and to be unsaturated towards the front of the magnetoresistive element. The saturated portions of the auxiliary shields magnetically behave as if they were not there (i.e. they act as a vacuum). Accordingly, recording heads with auxiliary shields are able to have optimized shield-to-shield spacing at the front of their transducers while reducing field decay across the length of the magnetoresistive elements. In another embodiment, recording heads have multiple magnets that are offset from the magnetoresistive elements. As will be described in greater detail below, these multiple offset magnets may also reduce field decay for example by reducing the strength of the field at the back of the magnetoresistive element.

Figure 3A:
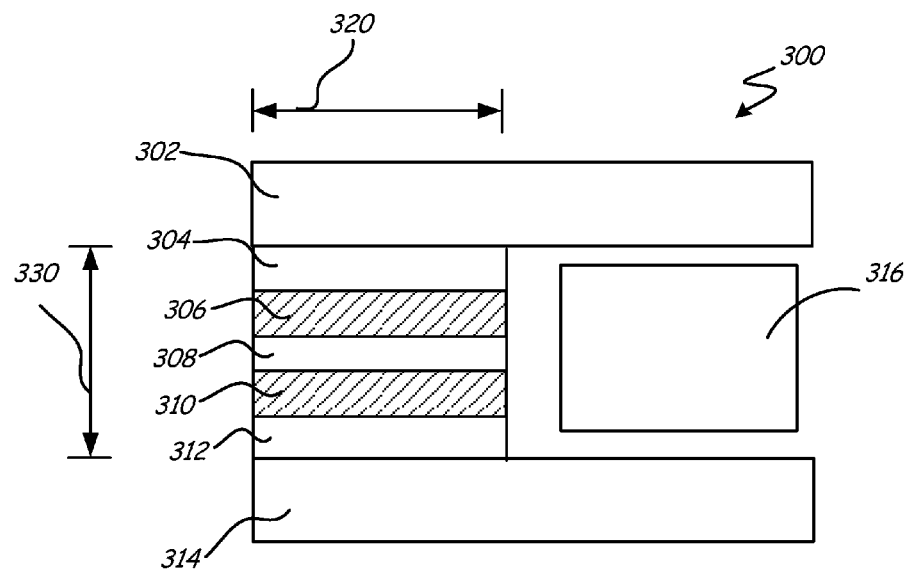
FIG. 3A is a cross-sectional view of a tri-layer reading element according to an embodiment.
Figure 3B:
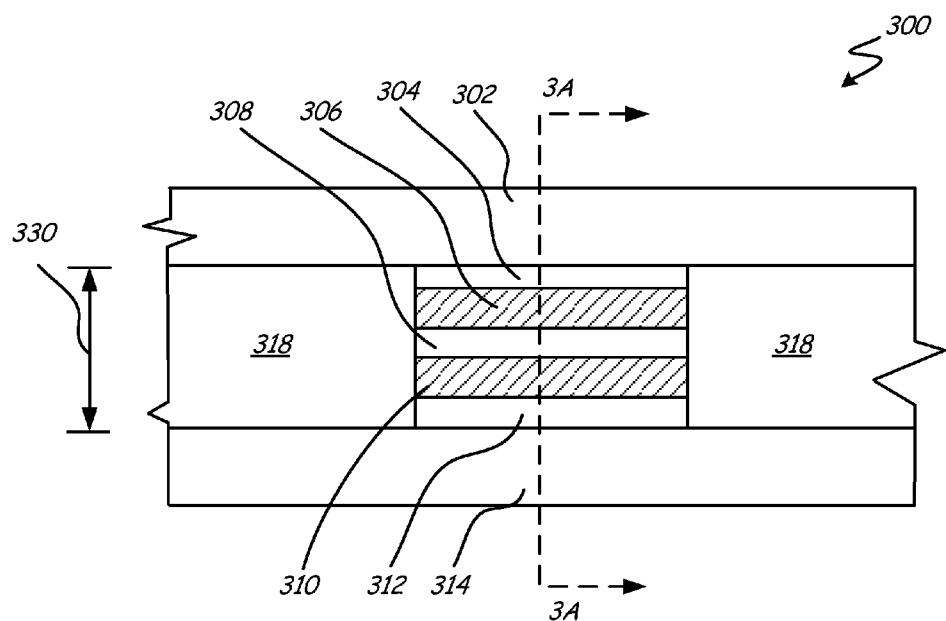
FIG. 3B is a view of the reading element of FIG. 3A from the air bearing surface side according to an embodiment.

FIGS. 3A and 3B illustrate a tri-layer magnetoresistive reading element, and FIGS. 4A, 4B, 4C, and 4D show the operation of a tri-layer reading element. Certain embodiments of the present disclosure are practiced with tri-layer reading elements. Embodiments are not however limited to any particular type of magnetoresistive element or reader design.

FIG. 3A is a cross-sectional view of tri-layer reading element 300, and FIG. 3B is a view of element 300 from the air bearing surface side (i.e. a view from the side facing a recording medium). Element 300 includes a top shield 302, a metallic cap 304, a second free layer 306, a magnetic tunnel junction 308, a first free layer 310, a metallic seed 312, a bottom shield 314, and a magnet 316. As is shown in the figure, the magnetoresistive element has a length 320 and a height 330. Height 330 also corresponds to the reading element's shield-to-shield spacing (i.e. the distance between top shield 302 and bottom shield 314). The components that faun the magnetoresistive circuitry are illustratively surrounded by an insulating material 318 (e.g. $Al_2O_3$, $SiO_2$, etc.).

In at least certain embodiments of recording heads, such as in the one shown in FIGS. 3A and 3B, the biasing effect of magnet 316 decays across the length of the reading element. For instance, the magnetic field is strongest at the portion of the reading element that is closest to magnet 316 and is the weakest at the portion of the reading element furthest from magnet 316 (i.e. the portion closest to the recording medium or the air-bearing surface). This uneven magnetic field may create different magnetic environments for different parts of the free layers, which may lead to magnetic instabilities and noise. Additionally, even small process variations in the manufacturing of the reading element (e.g. magnet to free layer spacing), may create large changes in the average magnetic biasing field. This may cause changes in the reading element's bias point and asymmetry.

FIGS. 4A, 4B, 4C, and 4D are simplified schematic diagrams illustrating the operation of a reading element with two free layers such as reading element 300 in FIGS. 3A and 3B. The resistance of the reading element is illustratively the greatest when the magnetic orientations of the free layers are one hundred and eighty degrees apart from each other (i.e. anti-parallel), and the resistance is illustratively the least when the magnetic orientations of the free layers are separated by zero degrees (i.e. the layers have the same magnetic orientation or are parallel).

FIG. 4A shows the magnetic orientations of the free layers when there is no magnet biasing field and no magnetized recording medium (i.e. there is no external magnetic field influencing the free layers). In FIG. 4A, the first free layer 410 is shown as having a magnetic orientation to the left, and the second free layer 420 is shown as having a magnetic orientation to the right. Or, in other words, free layers 410 and 420 have anti-parallel magnetic orientations, or are separated by one hundred and eighty degrees.

FIG. 4B shows the magnetic orientations of the two free layers in the presence of a magnet 400 biasing field. As is shown in the figure, magnet 400 biases both of the free layers downward. This reduces the angle separating the magnetic orientations of the two free layers. The angle is represented in the figure by the symbol "θ." The angle of separation is illustratively between zero and one hundred and eighty degrees. For example, the angle may be about ninety degrees. The angle is not however limited to any particular value.

FIGS. 4C and 4D show the magnetic orientations of the two free layers in the presence of a magnet 400 and also in the presence of a recording medium 430. In FIG. 4C, recording medium 430 has an upward magnetic orientation. This illustratively increases the angle between the magnetic orientations of the two free layers to an angle greater than ninety degrees. In FIG. 4D, recording medium 430 has a downward magnetic orientation. This illustratively decreases the angle between the magnetic orientations of the two free layers to an angle less than ninety degrees. Accordingly, depending upon the magnetization of recording medium 430, the resistance of the reading element will alternate between going towards its greatest value and its lowest value, and the recording head is able to determine the magnetization pattern of the recording medium.

Figure 5:
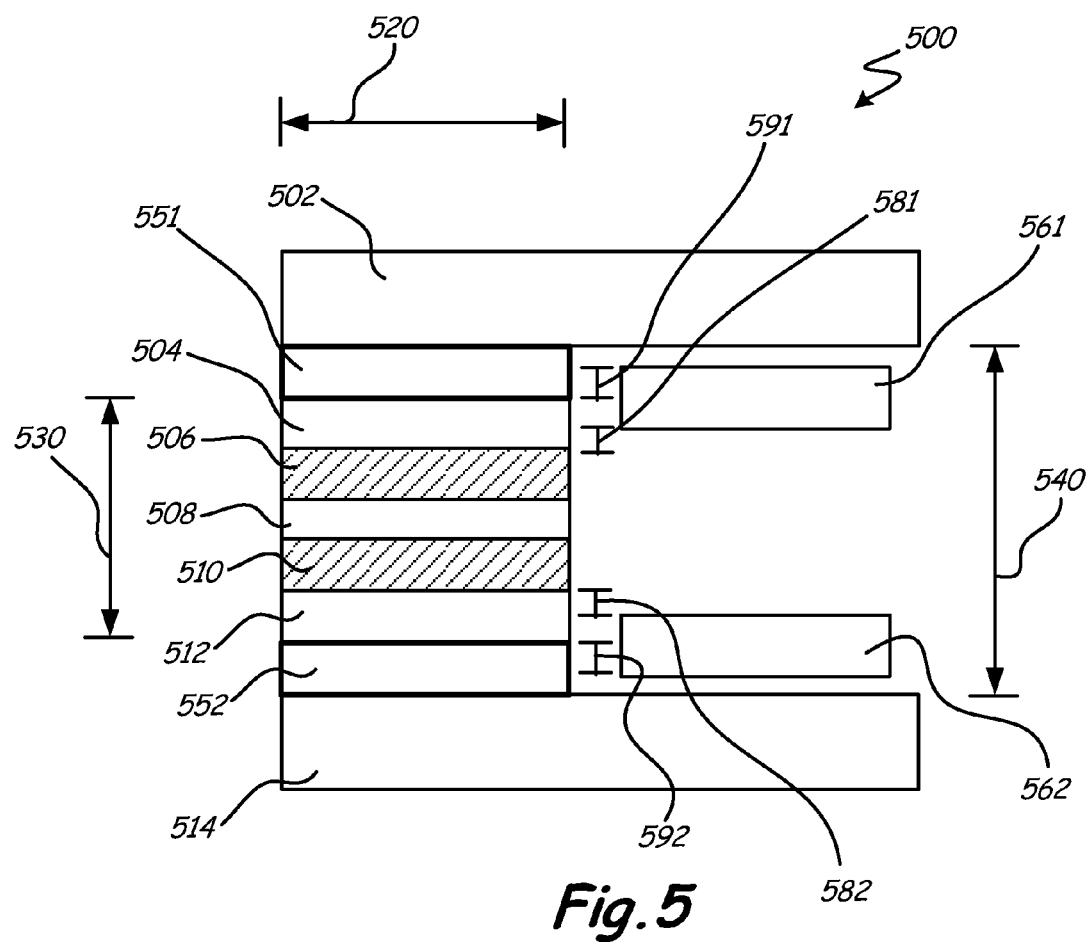
FIG. 5 is a cross-sectional view of a reading element having auxiliary magnetoresistive transducer shields and offset magnets according to an embodiment.
Figure 6:
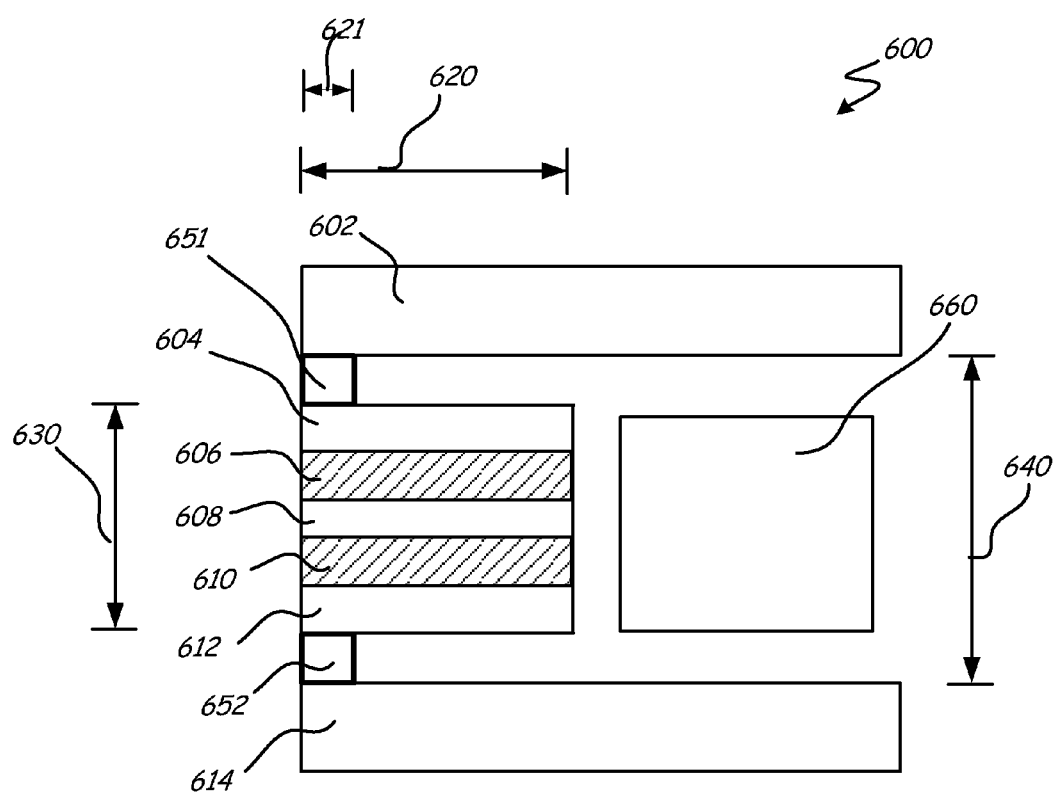
FIG. 6 is a cross-sectional view of a reading element having reduced length auxiliary magnetoresistive transducer shields according to an embodiment.

FIGS. 5 and 6 are cross-sectional views of reading elements according to the present disclosure. The reading elements are shown as having tri-layer magnetoresistive transducers. Embodiments are not however limited to tri-layer magnetoresistive transducers. Embodiments are illustratively practiced with any type or design of transducer.

Reading element 500 in FIG. 5 has a top shield 502, a metallic cap 504, a second free layer 506, a magnetic tunnel junction 508, a first free layer 510, a metallic seed 512, and a bottom shield 514. In addition to the primary shields 502 and 514, reading element 500 includes two auxiliary shields, a top auxiliary shield 551 and a bottom auxiliary shield 552. Reading element 500 also includes two magnets, a first magnet 561 and a second magnet 562. In an embodiment, magnet 561 and 562 are permanent magnets. Embodiments are not however limited to any particular type of magnet and embodiments illustratively include all type of magnets.

The auxiliary shields 551 and 552 are made from a magnetic material. In an embodiment, the shields are made from a material that has a magnetic saturation value such that the back of the auxiliary shields (i.e. the portions of the auxiliary shields closest to the magnets) are magnetically saturated by the magnets and the front of the auxiliary shields (i.e. the portions of the auxiliary shields farthest from the magnet or the portions closest to the recording medium) are not magnetically saturated. For instance, the auxiliary shields have magnetic saturation values between 0.4 Tesla to 0.6 Tesla. The auxiliary shields are optionally made of a higher magnetic saturation value material that has been diluted with a nonmagnetic material. For example, the shields are made of high permeability permalloy (i.e. NiFe) that has been diluted with copper. In another embodiment, the shields are made of high permeability permalloy that is laminated with a non-magnetic material. The non-magnetic material may be metallic (e.g. Ta, Ru, Cu, etc.) or insulating (e.g. $Al_2O_3$). Top shield 502 and bottom shield 514 may be made of a material with a higher magnetic saturation value. For example, shields 502 and 514 are optionally made from a permalloy alloy with a saturation value of approximately one Tesla. Magnets 561 and 562 are illustratively made from CoPt or FePt, and have magnetizations of approximately 1.1 Tesla. Magnets 561 and 562 are not however limited to any particular material or magnetization values.

FIG. 5 shows that reading element 500 includes a height or spacing 530, a height or spacing 540, and a length 520. Spacing 530 is the distance between the two auxiliary shields 551 and 552. Spacing 540 is the distance between the two primary shields 502 and 514, and length 520 is the length of the magnetoresistive element.

The auxiliary shields and magnets in reading element 500 separately and in combination may reduce the decay of the magnet biasing field across the magnetoresistive element (i.e. the free layers). As was previously mentioned, the auxiliary shields are made such that the back of the shields are magnetically saturated while the front of the shields are not magnetically saturated. The magnetically saturated portions of the shields have less of a decaying effect on the magnets' biasing fields. For instance, the magnetically saturated portions act as a vacuum that has no effect on the biasing fields. Accordingly, the effective shield-to-shield spacing at the back of the magnetoresistive element is approximately the top shield 502 to bottom shield 514 spacing 540. However, the effective shield-to-shield spacing at the front of the magnetoresistive element is approximately the top auxiliary shield 551 to bottom auxiliary shield 552 spacing 530. The recording element may then be able to have an effectively wider shield-to-shield spacing towards the back of the element which promotes a more even biasing field, while having a narrower shield-to-shield spacing at the front of the element to optimize aerial density.

As is shown in FIG. 5, the first magnet 561 is offset from the second free layer 506 by a distance 581, and overlaps the top auxiliary shield 551 for a height or distance 591. Similarly, second magnet 562 is offset from the first free layer 510 by a distance 582, and overlaps the bottom auxiliary shield 552 for a height or distance 592. The use of multiple magnets, offset magnets, and overlapping or partially overlapping magnets separately and in combination may also optimize the uniformity of the biasing field across the magnetoresistive element. For example, if only one magnet was used or if the magnets were not offset from the free layers (i.e. if the magnets were inline with the free layers), the biasing field at the back of the free layers would be stronger, and there would be a corresponding decrease in biasing field uniformity across the free layers. Also for example, the optional overlapping 591 and 592 of the magnets and the auxiliary shields illustratively help to saturate the auxiliary shields which may reduce the amount of bias field decay.

FIG. 6 shows a cross-sectional view of another embodiment of a reading element 600 with auxiliary shields. Element 600 comprises a top shield 602, a metallic cap 604, a second free layer 606, a metallic tunnel junction 608, a first free layer 610, a metallic seed 612, and a bottom shield 614. Element 600 differs from element 500 in its magnet and auxiliary shield configuration. Element 600's auxiliary shields 651 and 652 do not extend along the entire length 620 of the magnetoresistive element like the auxiliary shields 551 and 552 in element 500 do. Instead, shields 651 and 652 extend along a portion 621 of length 620. Additionally, auxiliary shields 651 and 652 may be made of different materials than shields 551 and 552. For example, in one embodiment, shields 651 and 652 are made from the same material that top shield 602 and bottom shield 614 are made of (e.g. permalloy). However, in another embodiment, shields 651 and 652 are made from the same materials as shields 551 and 552 in FIG. 5.

Reading element 600 illustratively includes at least some of the same features as reading element 500 in FIG. 5. The shield-to-shield spacing 640 at the back of the magnetoresistive element is wider which may promote a more uniform biasing field, while the shield-to-shield spacing 630 at the front of the element is narrower which may optimize aerial density.

FIG. 6 also shows that reading element 600 has one magnet 660. Element 600 is not however limited to having any particular magnet configuration. In one embodiment, element 600 has multiple magnets that are optionally offset from the free layers similar to the configuration shown in FIG. 5. Similarly, element 500 in FIG. 5 is not limited to any particular magnet configuration and optionally includes any configuration. For example, element 500 illustratively may include a one magnet design similar to the configuration shown in FIG. 6.

As has been discussed, embodiments of the present disclosure illustratively include recording heads that have one or more auxiliary shields around their reading elements and/or multiple overlapping magnets. These features independently and in combination may help to promote a more uniform biasing field across magnetoresistive elements. Additionally, these features promote the uniform biasing field while still maintaining reduced shield-to-shield spacings at the front of the device that may optimize aerial density. Embodiments further provide multiple shield configurations and magnet configurations that provide options for device manufacturing.

Finally, it is to be understood that even though numerous characteristics of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. In addition, although the embodiments described herein are directed to hard disc drives, it will be appreciated by those skilled in the art that the teachings of the disclosure can be applied to other types of data storage systems, without departing from the scope and spirit of the disclosure.

What is claimed is:

1. An apparatus comprising:
    a magnetoresistive read element aligned along an air bearing surface and extending therefrom a first overall length;
    a first shield and a second shield, the first and the second shields located on opposing sides of the magnetoresistive read element along the air bearing surface and extending therefrom a second overall length greater than the first overall length; and
    an auxiliary shield located between the magnetoresistive element and the first shield along the air bearing surface and configured to provide a uniform biasing field along the length of the magnetoresistive read element, the auxiliary shield extending from the air bearing surface a third overall length less than the second overall length.

2. The apparatus of claim 1, further comprising a magnet located between the first and the second shields to magnetically saturate a first end of the auxiliary shield, wherein an opposing second end of the auxiliary shield closest to the air bearing surface remains magnetically unsaturated.

3. The apparatus of claim 1, wherein the read element is a trilayer read element with two free layers.

4. The apparatus of claim 1, further comprising a second auxiliary shield that is located between the magnetoresistive element and the second shield in alignment with the air bearing surface to further provide a uniform biasing field along the length of the magnetoresistive read element, the second auxiliary shield extending from the air bearing surface a fourth overall length less than the second overall length.

5. The apparatus of claim 1, wherein the auxiliary shield is made of a magnetic material that has been laminated with a non-magnetic material.

6. The apparatus of claim 1, wherein the auxiliary shield is made of the same material as the first and the second shields.

7. The apparatus of claim 1, further comprising a permanent magnet disposed between the first and second shields, wherein the first and second shields have higher magnetic saturation values than the auxiliary shield so that a portion of the auxiliary shield closest to the permanent magnet is magnetically saturated and a portion of the auxiliary shield closest to the air bearing surface, the first shield and the second shield remain in a magnetically unsaturated state.

8. The apparatus of claim 1, wherein the magnetoresistive read element has a front surface aligned along the air bearing surface and opposing first and second read element side surfaces orthogonal to the front surface, the first shield has a front surface aligned along the air bearing surface and a first shield side surface in parallel facing relation to the first read element side surface, and the auxiliary shield contactingly engages the first shield side surface and the first read element side surface.

9. The apparatus of claim 1, wherein the second and third overall distances are nominally equal.

10. The apparatus of claim 1, wherein the third overall distance is significantly less than the second overall distance.

11. An apparatus comprising:
    first and second shields aligned along the air bearing surface;
    a magnetoresistive element aligned along the air bearing surface between the first and second shields;
    an auxiliary shield aligned along the air bearing surface between the magnetoresistive element and the first shield; and
    at least one magnet between the first and second shields, the magnetoresistive element between said at least one magnet and the air bearing surface, the at least one magnet saturating a first end of the auxiliary shield closest to the magnet and leaving an opposing second end of the auxiliary shield in an unsaturated state so as to increase uniformity of a biasing field along a length of the magnetoresistive element.

12. The apparatus of claim 11, wherein the at least one magnet comprises two magnets spaced apart from each other.

13. The apparatus of claim 12, wherein the auxiliary shield and the first and second shields are formed of a common material.

14. The apparatus of claim 12, wherein the auxiliary shield is formed of a first material, and the first and second shields are each formed of a different second material.

15. The apparatus of claim 12, wherein the two magnets are offset from the magnetoresistive element.

16. The apparatus of claim 11, further comprising a second auxiliary shield aligned along the air bearing surface between the magnetoresistive element and the second shield, the at least one magnet fully saturating a first end of the second auxiliary shield closest to the magnet and leaving an opposing second end of the second auxiliary shield in an unsaturated state.

17. An apparatus comprising:
    a magnetoresistive read element having an air bearing surface and opposing first and second side surfaces having a first overall length;
    first and second shields located on opposing sides of the magnetoresistive read element in facing relation to the respective first and second side surfaces and respectively aligned along the air bearing surface, the first and second shields extending from the air bearing surface a second overall length; and
    an auxiliary shield configured to increase uniformity of a biasing field of the magnetoresistive read element, the auxiliary shield located between the first side surface of the magnetoresistive element and the first shield along the air bearing surface and extending from the air bearing surface a third overall length less than the second overall length.

18. The apparatus of claim 17, further comprising a second auxiliary shield contactingly disposed between the second side surface of the magnetoresistive element and the second shield along the air bearing surface, the first and second auxiliary shields each having a first end proximate the air bearing surface in a magnetically unsaturated state and each having an opposing second end in a magnetically saturated state.

19. The apparatus of claim 17, further comprising at least one permanent magnet between the first and second shields and adjacent the magnetoresistive element opposite said air bearing surface to magnetically saturate a portion of the auxiliary shield closest to the at least one permanent magnet.

20. The apparatus of claim 17, wherein the third overall length is less than the first overall length.

* * * * *